United States Patent

Stark et al.

[15] 3,696,186

[45] Oct. 3, 1972

[54] METHOD OF EXPANDING A PLIABLE MATERIAL

[72] Inventors: John E. Stark, London, England; Adrian G. Vanoostveen, Niagara Falls, Ontario, Canada

[73] Assignee: Fod Motor Company, Dearborn, Mich.

[22] Filed: Feb. 3, 1970

[21] Appl. No.: 8,213

[30] Foreign Application Priority Data

Nov. 28, 1969 Canada...........................68584

[52] U.S. Cl. ..................264/292, 264/160, 264/288, 264/291
[51] Int. Cl. .........................B28b 11/08, B29c 17/02
[58] Field of Search ..264/160 VG, 291 VG, 89, 326, 264/295, 292, 237, 348, 288; 18/1 FS, 1 FB, 10

[56] References Cited

UNITED STATES PATENTS

| 2,700,007 | 1/1955 | Dennison et al. | 264/291 |
| 2,702,406 | 2/1955 | Reed | 264/291 |
| 2,817,117 | 12/1957 | Shields et al. | 264/291 |
| 2,937,407 | 5/1960 | Richardson | 264/291 |
| 3,038,206 | 6/1962 | Eccles | 264/160 |
| 3,038,208 | 6/1962 | Fujioka | 264/291 |
| 3,058,160 | 10/1962 | Mocker et al. | 264/292 |
| 3,244,779 | 4/1966 | Levey et al. | 264/291 |
| 3,293,343 | 12/1966 | Mattimoe et al. | 264/291 |
| 3,354,253 | 11/1967 | Rasmussen | 264/291 |
| 3,419,651 | 12/1968 | Miller et al. | 264/291 |

*Primary Examiner*—Jay H. Woo
*Attorney*—John R. Faulkner and William E. Johnson

[57] ABSTRACT

A method has the following general steps for expanding a continuous length of a pliable material so that originally parallel and straight lateral edges thereof are stretched to curved configurations of different arc lengths. A continuous length of the material is unwound and heated to a temperature at which the material is pliable. The material is expanded between a first line which is both located on a surface of a first object and perpendicular to the lateral edges of the material, and a second line which is located on a surface of a second object, which second line is coplanar with the first line but in skew relationship thereto. The expanded material is continuously moved along a substantial length of the second object's surface. The expanded material is cooled while in engagement with the second object's surface to a temperature at which the material is sufficiently rigid that it may be removed and cut to finite lengths to form the desired article.

10 Claims, 3 Drawing Figures

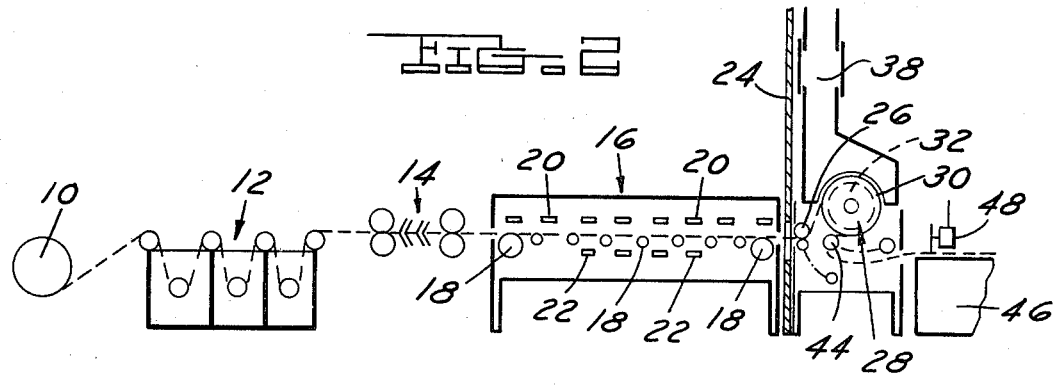
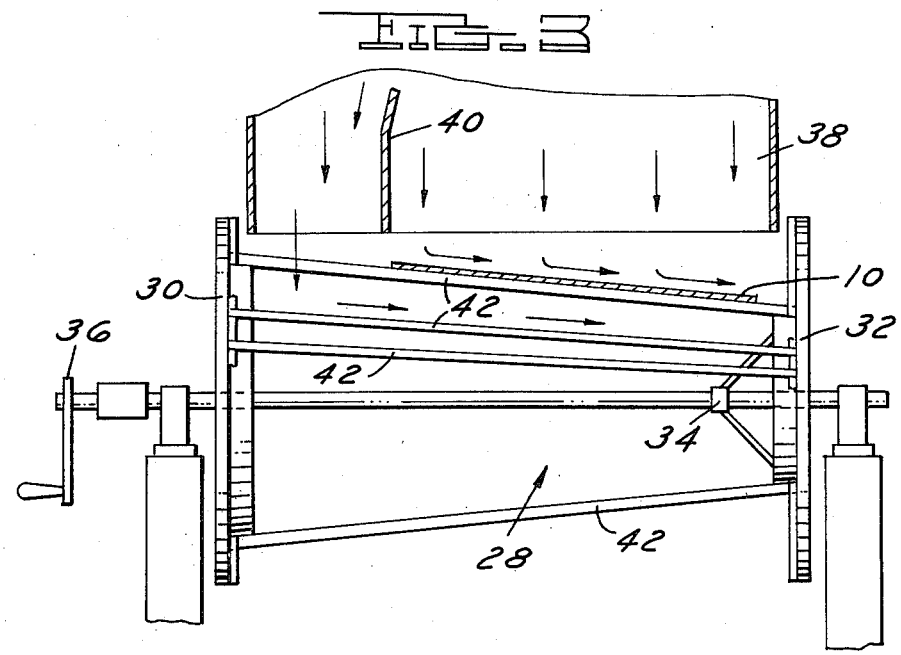
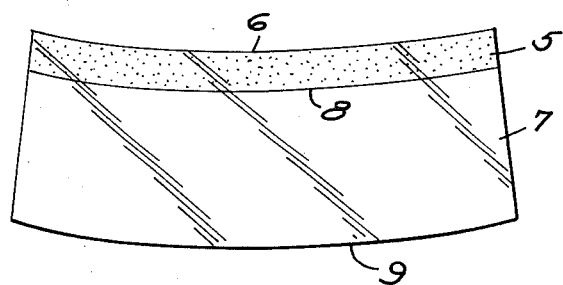

METHOD OF EXPANDING A PLIABLE MATERIAL

BACKGROUND OF THE INVENTION

Various methods and apparatuses have been devised for use in stretching the vinyl material having a tinted band that is utilized as a laminating layer between the glass brackets utilized to form an automotive windshield. Some typical prior art apparatuses and methods are shown in U.S. Pat. No. 2,933,759 issued Apr. 26, 1960, and U.S. Pat. No. 3,019,475 issued Feb. 6, 1962.

The above two mentioned patents disclose methods and apparatuses of stretching a plasticized polyvinyl butyral web utilized to form the interlayer of an automotive windshield. The stretching of such material is necessary when a tinted band is placed along one lateral edge of the material so that the material may be utilized in the formation of a tinted windshield for an automotive vehicle. More particularly, the tinted band or gradient band is located at the top of the windshield in order to reduce the light transmission capability of the windshield in that area. This reduction in light transmission aids the operator of the vehicle by reducing the amount of glare he is subjected to, thereby improving his field of vision.

When the gradient band windshield has both horizontal and vertical curvature, it is necessary to stretch each interlayer prior to placing it between two glass brackets. This stretching is necessary so that upon lamination of two glass brackets with the interlayer, the edge of the gradient band across the windshield will appear as a straight line when the windshield is assembled in an automobile. In its stretched condition, the interlayer will have the lateral edges thereof formed into curved configurations with different arc lengths. To facilitate the manufacture of the interlayer material, the material is produced in large rolls with the lateral edges thereof in a parallel and straight condition. Many individual interlayers may be formed from one such large roll of material.

The above two mentioned patents show methods and apparatuses for stretching the original continuous length of interlayer material into a stretched condition to make it acceptable for utilization in the laminating procedure. The method of this invention is an improvement over the methods known in the prior art in that the present method is much simpler and less costly in operation.

SUMMARY OF THE INVENTION

This invention relates to a method of expanding a continuous length of material and, more particularly, to a method of expanding a continuous length of a vinyl interlayer material utilized in forming a gradient band windshield for an automotive vehicle. The method of this invention is carried out in the following manner.

A continuous length of a material having originally parallel and straight lateral edges is unwound from a roll thereof so that the material may be stretched to a final configuration in which the edges of the material are curved with opposite lateral edges having a different arc length. Once unwound, a differential section of the material is continuously heated to a temperature at which the material is sufficiently pliable for stretching. A differential section of the heated material is continuously expanded between a first line that is both located on the surface of a first object and perpendicular to the lateral edges of the material, and a second line located on a surface of a second object, which second line is coplanar with the first line but in skew relationship thereto. A differential section of the expanded material is continuously moved away from the second line on the second object by moving the expanded material both along the surface of the second object and over a substantial length of the total surface area defined by the second object. While moving along the surface area defined by the second object, the expanded material is cooled to a temperature at which the material is no longer pliable but is substantially rigid. A differential section of the expanded material is continuously removed from the second surface of the second object and finite lengths of the material are cut from the removed material. Each finite length of the material serves as one interlayer and it has its lateral edges stretched to curved configurations of different arc lengths.

In greater detail, the first object is a rotatable cylindrical roll and the second object is a rotatable conical roll. In still further detail, the conical roll is defined by a plurality of spaced apart members extending generally across the width of the material and the cooling of the stretched material is accomplished by directing separate streams of a chilling fluid against both sides of the material as the material passes along the conical surface area defined by the second object. In still further detail, the original heating of the material is done in a fashion such that one surface of the material is heated to a temperature higher than the other surface, the higher temperature surface being the surface which does not have a tinted or gradient band therealong.

BRIEF DESCRIPTION OF THE DRAWINGS

FIG. 1 is a graphic view of a windshield formed with an interlayer stretched by the method of this invention.

FIG. 2 is a diagrammatic, elevational view, partly in cross section, of apparatus employed in the method of this invention.

FIG. 3 is a front view of a portion of the apparatus shown in FIG. 2.

DESCRIPTION OF THE PREFERRED EMBODIMENT

In the formation of an automotive safety windshield, a pair of glass brackets are laminated together with an interposed sheet of a plasticized polyvinyl butyral. The glass brackets have an approximate thickness of 0.125 inch and the interlayer has a thickness of approximately 0.030 inch. The formation of such a laminated assembly is well known in the art.

In many cases, it is desirable to include in the laminating interlayer a darkened or gradient tint band at the top portion thereof to reduce the amount of light which is allowed to enter into the automotive vehicle through the top portion of the windshield. With reference to FIG. 1, this particular band is generally known as the gradient band 5 and preferably is graduated with the intensity of coloration decreasing from the top 6 of the windshield 7 to a position 8 spaced from the bottom 9 thereof. Because most modern day automotive windshields have both a horizontal and a vertical curvature thereto, it is necessary to stretch the gradient vinyl to the proper curvature prior to laminating the vinyl with the pair of glass brackets. More particularly, in order that the end of the gradient tint line 8 in the windshield appear as a uniform horizontal line when the windshield is installed in an automobile vehicle, it is necessary to stretch the interlayer material so that the upper and lower edges thereof have a proper radius of curvature prior to the lamination of the material. As shown in FIG. 1, the lower portion or line 8 of the gradient band 5 is not horizontal. However, when the windshield 7 is installed in an automotive vehicle, the angle of installation of the windshield will be such that the bottom of the band will appear as a straight line when viewed from the exterior of the automobile.

The vinyl material used for the interlayer, as purchased, is in a continuous roll wherein the opposite lateral edges thereof are in a substantially parallel relationship. As a final expanded product, finite lengths of the interlayer are formed from the roll in such a configuration that the upper and lower lateral edges of the interlayer are stretched to curved configurations of different arc lengths. Generally, the upper edge of the gradient band interlayer is of smaller arc length than the lower edge thereof.

The method of this invention will be understood best by reference to the associated drawings. More particularly, with reference to FIG. 2 of the drawings, a continuous roll of commercially available, polyvinyl butyral 10 is shown as it is unwound. The roll of vinyl is formed so that one edge thereof has a gradient, tinted band therealong. The tinted band would be facing upward and on the far side of the apparatus as viewed in FIG. 2.

The vinyl material is unrolled and put through a plurality of rinsing solutions at a rinsing station 12. At the rinsing station, water is utilized to wash from the surface of the vinyl fine dust material which is placed thereon in order to keep the various convolutions of the material in the roll 10 separate during its handling and shipping.

After passing through the washing and rinsing station 12, a differential section of the vinyl ribbon 10 is passed through a squeegee station 14 wherein rollers and air jets are utilized to remove any excess moisture therefrom. From the squeegee station, the vinyl ribbon is passed into a ribbon heating station 16. In the heating station, a plurality of rolls 18 are employed to support the web during its passage therethrough. Within the station are a plurality of upper heating elements 20 and lower heating elements 22. The heating elements may be employed in such a manner as to uniformly heat the vinyl to a preselected temperature of about 170° F. at which the vinyl may be stretched. In the alternative, the heating pattern may be such that one surface of the vinyl is heated to a greater temperature than the other surface. In this case, the upper surface is heated to the lower temperature of about 150° F. so it will be at a temperature which would not affect the tinted band along the one lateral edge thereof.

The ribbon of vinyl passes from the ribbon heating station 16 through an opening in a partition wall 24 into another room which contains further processing equipment. The other room is maintained at both a preselected humidity and a preselected temperature so that the vinyl, after it is cut into individual interlayer pieces, may be stored for subsequent processing without the amount of moisture therein increasing.

As the ribbon passes through the opening in the partition 24, it passes around a rotatable cylindrical or take-off roll 26 which is driven at the same speed as the linear speed of movement of the vinyl material. The ribbon material departs from the cylindrical roll 26 along a first straight line which is generally perpendicular to the lateral edges of the ribbon of vinyl 10. From the cylindrical roll, the ribbon of vinyl is directed to a rotatable conical roll 28, best seen in FIG. 3.

The conical roll 28 has a large end 30 of about 30 inches in diameter and a small end 32 of about 24 inches in diameter. The desired angle of the cone may be adjusted by means of adjustable mechanism 34 operated by crank 36 in a standard manner which would change the diameters of the cone. The exact angle of the cone determines the radius which is generated in both the upper and lower edges of the ribbon of vinyl 10 passing thereover. More particularly, the stretching of the vinyl occurs from its first line of contact leaving the cylindrical or take-off roll 26 to a second line of contact on the conical roll 28. This second line of contact is coplanar with the first or departing line of contact but in skew relationship thereto. Thus, as the web travels from the cylindrical roll 26 to the conical roll 28, it is differentially stretched because of the difference in speeds found at the different ends of the conical roll. The small diameter end 32 of the cone is driven at the same peripheral speed as the cylindrical roll and, therefore, that end of the material will not be stretched while the end of the vinyl material going over the large end 30 of the conical roll will be stretched substantially. In the usual processing method, the tinted or gradient band portion of the ribbon is located near the small diameter end of the cone. The large diameter end of the cone applies a greater stretching action to the ribbon and thus permits the development of a greater radius in the bottom portion of the vinyl passing thereover.

Mounted above the conical roll 28 by suitable means, not shown, is a delivery pipe 38 for a cold air cooling system used to cool the vinyl on the conical roll. The air fed through the pipe has a temperature of approximately 40° F. The delivery pipe contains an internal baffel 40, shown in FIG. 4, which divides the air flowing down the chamber or pipe into two streams. The major portion of the air is flowed over the upper surface of the web 10 as it rests on elements 42 making up the exterior surface of the conical member 38. These elements 42 are individual slats about one-sixteenth of an inch thick with seven-sixteenths of an inch between facing elements and they extend from the small end of the conical roll to the large end thereof. By such construction, a second portion of the stream of cooling air which is delivered by the pipe 38 flows down through the elements and along the side of the ribbon resting on the elements thereby cooling the inside surface of the web 10.

As best seen in FIG. 1, the ribbon, while laying on the moving conical roll 28, is moved along a substantial portion of the surface area defined by the conical roll 28 and is removed therefrom around a take-off roll 44, at which time the vinyl has a temperature of about 70° F. From the take-off roll 44, the ribbon is fed to a table 46 above which a cut-off machine 48 is mounted. A portion of the ribbon is drawn under the cut-off machine by an operator and then the cut-off machine is moved over the table 46 thereby cutting off a finite length of the vinyl. This finite length of vinyl will have the lateral edges thereof stretched to curved configurations of different arc lengths.

OPERATION

The operation of the apparatus utilized in conjunction with the method of this invention will now be described in detail. A web 10 of commercially available material formed from plasticized polyvinyl butyral is utilized as the interlayer material. This is commercially available in lengths of 800 and 1500 feet with various widths, e.g., of about 28.5 inches.

In making a particular interlayer wherein the vinyl had a width of 27 inches, the rate of unwinding and washing of the vinyl material was at 18 feet per minute. Similarly, the conical roll was driven at a speed such that the small diameter end 32 thereof was also travelling at a rate of 18 feet per minute. The cone angle was set for theoretical radius of 83 inches to produce a curvature in the vinyl of 100 inches at the upper edge and 127 inches at the lower edge thereof.

The vinyl fed to the web heating station 16 was heated in such a manner by the upper heating elements therein that the upper surface was heated to a final temperature of 150° F. while the lower surface of the material was heated to a temperature of 170° F. The reason for the imbalance in the temperatures to which the two surfaces are heated is that the upper surface carries the tinted band and is more temperature sensitive then the lower surface of the vinyl. By differentially heating upper and lower surfaces of the vinyl, less heat must be removed by the flowing of the cooling air over the vinyl as it travels around the conical roll. The vinyl is cooled on the conical roll to a temperature of about 70° F. before it is removed therefrom and cut into finite lengths.

While the preferred embodiment of this invention has been described in conjunction with a gradient band vinyl material, it is understood that the method may also be applied to clear vinyl material not having a tinted band therealong. When utilized with clear vinyl, a substantial cost savings is realized by this method because a narrower vinyl material may be utilized in forming the interlayer for individual windshields.

We claim:

1. A method of expanding a continuous length of polyvinyl butyral so that originally parallel and straight lateral edges thereof are stretched to curved configurations of different arc lengths, which method comprises:

unwinding a continuous length of the polyvinyl butyral;

heating continuously a differential section of the polyvinyl butyral to a temperature in the range of about 150° F, to about 180° F, so the polyvinyl butyral is sufficiently pliable so that it may be stretched;

expanding continuously a differential section to the polyvinyl butyral by stretching the polyvinyl butyral while in a heated condition between a first line located on the surface of a cylindrical roll and perpendicular to the lateral edges of the polyvinyl butyral and a second line located on a surface of a rotatable conical roll defined by a plurality of spaced apart members, which second line is coplanar with said first line but in skew relationship thereto;

moving continuously a differential section of the expanded polyvinyl butyral away from said second line on said conical roll by moving the expanded polyvinyl butyral along the surface of said conical roll defined by said spaced apart members and over a substantial length of the total surface area defined by said conical roll;

cooling the expanded polyvinyl butyral while the polyvinyl butyral is moving along said conical roll by directing streams of a chilling fluid against both sides of the polyvinyl butyral as the polyvinyl butyral passes over the surface of said conical roll, said polyvinyl butyral being cooled to a temperature below about 70° F, at which the polyvinyl butyral is no longer pliable but is substantially rigid;

removing continuously a differential section of the expanded polyvinyl butyral from said conical roll; and cutting finite lengths of the polyvinyl butyral from the continuous length thereof when removed from said conical roll, each finite length having lateral edges thereof stretched to curved configurations of different arc lengths.

2. A method of expanding a continuous length of a material so that originally parallel and straight lateral edges thereof are stretched to curved configurations of different arc lengths, which method comprises:

unwinding a continuous length of the material;

heating continuously a differential section of the material to a temperature at which the material is sufficiently pliable so that the material may be stretched;

expanding continuously a differential section of the material by stretching the material while in a heated condition between a first line both located on a surface of a first object and perpendicular to the lateral edges of the material and a second line located on a surface of a second object, which second line is coplanar with said first line but in skew relationship thereto;

moving continuously a differential section of the expanded material away from said second line on said second object by moving the expanded material both along the surface of said second object and over a substantial length of the total surface area defined by said second object;

cooling the expanded material while the material is moving along said surface area of said second object to a temperature at which the material is no longer pliable but is substantially rigid;

removing continuously a differential section of the expanded material from said second object; and cutting finite lengths of the material from the continuous length of material when removed from said second object, each finite length having lateral edges thereof stretched to curved configurations of different arc lengths.

3. The method of claim 2 wherein: said first object is a rotatable cylindrical roll and said second object is a rotatable conical roll.

4. The method of claim 3 wherein said surface of said second object is defined by a plurality of spaced apart members, and wherein said cooling is accomplished by directing streams of a chilling fluid against both sides of the material as the material passes over the surface of said second object.

5. The method of claim 4 wherein: said separate streams of said chilling fluid are formed by: initially establishing a single stream of chilling fluid; flowing said single stream toward the outer surface of said second object; dividing said single stream into two substreams; directing one substream onto the outer surface of said second object to cool the outside surface of the material; directing a second substream through the openings in said surface of said second object between said spaced apart members which are not covered by the material; and flowing said second substream of chilling medium over the inside surface of the material supported on said surface of said second object; whereby both sides of the expanded material are simultaneously cooled while moving over said surface of said second object.

6. A method of expanding a continuous length of a material having a tinted band along a lateral edge of one side thereof so that originally parallel and straight lateral edges thereof are stretched to curved configurations of different arc lengths, which method comprises:
unwinding a continuous length of the material;
heating continuously to different temperatures the opposite surfaces of a differential section of the material, the different temperatures being sufficiently high that the material is pliable and may be stretched, the cooler surface of the material being the surface having the tinted band along the lateral edge thereof;
expanding continuously a differential section of the heated material between a first line both located on a surface of a first object and perpendicular to the lateral edges of the material, and a second line located on a surface of a second object, which second line is coplanar with said first line but in skew relationship thereto;
moving continuously a differential section of the expanded material away from said second line on said second object by moving the expanded material both along the surface of said second object and over a substantial length of the total surface area defined by said second object;
cooling the expanded material while the material is moving along said surface area of said second object to a temperature at which the material is no longer pliable but is substantially rigid;
removing continuously a differential section of the expanded material from said second object; and
cutting finite lengths of the material from the continuous length of material when removed from said second object, each finite length having lateral edges thereof stretched to curved configurations of different arc length.

7. The method of claim 6 wherein: said first object is a rotatable cylindrical roll and said second object is a rotatable conical roll and wherein the surface of the material heated to the cooler temperature does not contact the surface of said second roll as the material passes thereover.

8. The method of claim 7 wherein: said surface of said second object is defined by a plurality of spaced apart members extending laterally across the material, and wherein said cooling is accomplished by directing separate streams of a chilling fluid against both sides of the material as the material passes over said surface of said second object.

9. The method of claim 8 wherein: said separate streams of said chilling fluid are formed by: initially establishing a single stream of chilling fluid; flowing said single stream toward the outer surface of said second object; dividing said single stream into two substreams; directing one substream onto the outer surface of said second object to cool the outside surface of the material; directing a second substream through the openings in said surface of said second object between said spaced apart members which are not covered by the material; and flowing the second substream of chilling medium over the inside surface of the material supported on said spaced apart members defining the surface of said second object; whereby both sides of the expanded material are simultaneously cooled while moving along a substantial portion of said surface area of said second object.

10. The method of expanding a continuous length of polyvinyl butyral as defined in claim 1 wherein: the polyvinyl butyral has a tinted band along a lateral edge of one side thereof, wherein said side having the tinted band therealong is heated to a temperature of about 150° F, in said heating step, and wherein said side not having the tinted band therealong is heated to a temperature of about 170° F, in said heating step.

* * * * *